C. F. Taylor
Cultivator

No. 74775

PATENTED
FEB 25 1868

WITNESSES
C. S. Orton
C. F. Brown

INVENTOR
C. F. Taylor, by
Geo. E. Brown,
Atty.

United States Patent Office.

C. F. TAYLOR, OF VASSALBORO, MAINE.

Letters Patent No. 74,775, dated February 25, 1868.

IMPROVEMENT IN CULTIVATORS.

*The Schedule referred to in these Letters Patent and making part of the same.*

TO ALL WHOM IT MAY CONCERN:

Be it known that I, C. F. TAYLOR, of Vassalboro, in the county of Kennebec, and State of Maine, have invented a new and improved Cultivator; and I do hereby declare that the following is a full, clear, and exact description of the construction and operation of the same, reference being had to the annexed drawings, making a part of this specification, of which—

Figure 1:
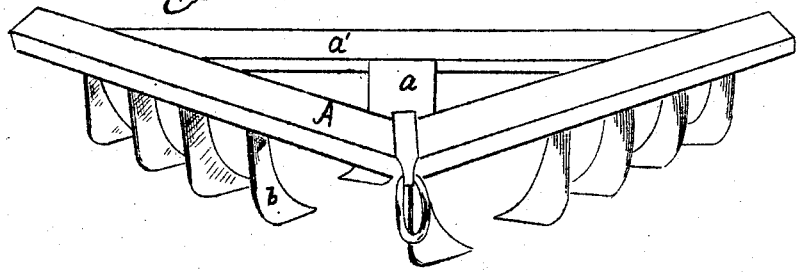
Figure 2:

Figure 1 is a perspective view, and
Figure 2 a side elevation.

This invention consists in the combination of an A-shaped frame with peculiarly-arranged teeth for the purpose of thoroughly pulverizing the soil, and at the same time leaving a smooth surface, as will hereinafter more fully appear.

To enable others skilled in the art to make and use my invention, I will proceed to describe its construction and operation.

A represents an A-shaped frame, of wood, with a centre-piece, $a$, and cross-piece, $a'$, which greatly strengthen the framework without adding much to its weight. This species of framework can be much more easily put together than the ordinary lattice-work, and is strong and light, being of the shape of the king-post truss used in architecture for the attainment of great strength. $b$ represents the teeth, which are made of comparatively thin metal, so as to present narrow cutting-edges, such as may be forced through the soil with least resistance, and will keep themselves sharp as they wear away. These teeth, when of a plane surface, are trapeziums in shape, with two small flanges, $b'$, projecting in opposite directions from the longer side, by means of which the teeth are attached to the framework. To fit these for use, one of the corners is bent out of a plane surface, as shown, sufficiently to impart a curvature to the whole rear side. The front side is made sloping backward.

It is evident that teeth curved in this manner have a tendency, as the cultivator is drawn along, to loosen the soil upward, and thus materially assist in its pulverization. The teeth $b$, that are attached to the side-pieces of the framework, are all so arranged as to throw the soil inward. No tooth throws its earth in the way of the next tooth following, consequently each tooth cuts its full slice directly from the land, so that the soil is thoroughly broken up. Each tooth throws its earth over against and upon that of the next preceding tooth, and thus the surface behind the cultivator is left smooth, without ridges or furrows.

I do not allege any novelty in the shape of the teeth.

Having thus fully described my invention, what I claim as new, and desire to secure by Letters Patent, is—

The A-shaped cultivator A, with its centre-piece $a$, and cross-piece $a'$, in combination with the teeth $b$, so arranged as to throw the earth inward, as and for the purpose described.

C. F. TAYLOR.

Witnesses:
T. S. PERCIVAL,
E. W. WHITEHOUSE.